US009266997B2

(12) United States Patent
Peters

(10) Patent No.: US 9,266,997 B2
(45) Date of Patent: Feb. 23, 2016

(54) POLYURETHANE FOAM AND ASSOCIATED METHOD AND ARTICLE

(71) Applicant: SABIC Global Technologies B.V., Bergen op Zoom (NL)

(72) Inventor: Edward Norman Peters, Lenox, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 221 days.

(21) Appl. No.: 14/032,254

(22) Filed: Sep. 20, 2013

(65) Prior Publication Data

US 2015/0087736 A1  Mar. 26, 2015

(51) Int. Cl.
*C08G 18/48* (2006.01)
*C08G 18/08* (2006.01)
*C08G 101/00* (2006.01)

(52) U.S. Cl.
CPC ............ *C08G 18/4879* (2013.01); *C08G 18/14* (2013.01); *C08G 18/4804* (2013.01); *C08G 18/4812* (2013.01); *C08G 18/4816* (2013.01); *C08G 18/4829* (2013.01); *C08G 2101/00* (2013.01); *C08G 2101/005* (2013.01); *C08G 2101/0058* (2013.01); *C08G 2101/0083* (2013.01)

(58) Field of Classification Search
CPC .................................................. C08G 18/4879
See application file for complete search history.

(56) References Cited

U.S. PATENT DOCUMENTS

| | | | |
|---|---|---|---|
| 3,256,215 A * | 6/1966 | Doedens et al. ............. 521/131 |
| 3,383,340 A | 5/1968 | MacCallum et al. | |
| 3,575,896 A * | 4/1971 | Khan .......................... 28/315.5 |
| 3,770,850 A | 11/1973 | White | |
| 4,238,580 A | 12/1980 | Loucks et al. | |
| 4,289,682 A | 9/1981 | Peters | |
| 4,487,918 A | 12/1984 | Heitz et al. | |
| 4,521,584 A | 6/1985 | Heitz et al. | |
| 4,677,185 A | 6/1987 | Heitz et al. | |
| 5,064,869 A | 11/1991 | Bopp et al. | |
| 5,164,421 A | 11/1992 | Kiamil et al. | |
| 5,648,019 A | 7/1997 | White, III et al. | |
| 5,880,221 A | 3/1999 | Liska et al. | |
| 6,051,662 A | 4/2000 | Tracy et al. | |
| 6,307,010 B1 | 10/2001 | Braat et al. | |
| 6,962,965 B2 | 11/2005 | Yeager | |
| 7,541,421 B2 | 6/2009 | Carrillo et al. | |
| 7,615,604 B2 | 11/2009 | Verborgt et al. | |
| 7,671,167 B2 | 3/2010 | Carrillo et al. | |
| 2005/0187373 A1 | 8/2005 | Yeager | |
| 2008/0076843 A1 | 3/2008 | Clark | |
| 2011/0124760 A1 | 5/2011 | Chen et al. | |
| 2011/0130476 A1 | 6/2011 | Chew et al. | |
| 2011/0152471 A1 | 6/2011 | Kamalakaran et al. | |
| 2012/0009414 A1 | 1/2012 | Golini | |
| 2012/0037410 A1 | 2/2012 | Amou et al. | |
| 2012/0259086 A1 | 10/2012 | Yamashita et al. | |

FOREIGN PATENT DOCUMENTS

| | | |
|---|---|---|
| CN | 102382382 A | 3/2012 |
| GB | 1005043 A * | 9/1965 |
| GB | 1330947 | 9/1973 |
| WO | 9304101 A1 | 3/1993 |
| WO | 2012177361 A1 | 12/2012 |

OTHER PUBLICATIONS

Johannes Karl Fink; Reactive Polymers Fundamentals and Applications: A Concise Guide to Industrial Polymers; Dec. 2013.*
International Search Report dated Dec. 18, 2014; International Application No. PCT/US2014/054895; International Filing Date Sep. 10, 2014 (5 pages).
Written Opinion dated Dec. 18, 2014; International Application No. PCT/US2014/054895; International Filing Date Sep. 10, 2014 (4 pages).
U.S. Appl. No. 13/538,295, filed Jun. 29, 2013.
U.S. Appl. No. 13/647,829, filed Oct. 9, 2012.
U.S. Appl. No. 13/929,961, filed Jun. 28, 2013.
U.S. Appl. No. 13/953,858, filed Jul. 30, 2013.
Chan et al., "Facile Quantitative Analysis of Hydroxyl End Groups of Poly(2,6-dimethyl-1,4-phenylene oxide)s by 31P NMR Spectroscopy", Macromolecules, 1994, vol. 27, pp. 6371-6375.
"DABCO 33-LV: Polyurethane Additives Product Bulletin", Air Products and Chemicals, Inc., 2012, Pub. No. 140-11-049-GLB, 2 pages.
Ethacure 100 Curative, Product Data Sheet, Jul. 2011, 2 pages.
Levchick et al., "Thermal decomposition, combustion and fire-retardancy of polyurethanes • a review of the recent literature", Polym. Int., 53, 1585-1610 (2004).
Niax Catalyst A-1, Technical Data Sheet, Momentive, HCD-14618, Jul. 18, 2013, 3 pages.
Polycat 8 Catalyst, Air Products and Chemical, Inc., 2013, 2 pages.
White, "Reactions of Poly (phenylene Oxide) s with Quinones. I. The Quinone-Coupling Reaction Between Low-Molecular-Weight Poly (2,6-Dimethyl-1,4-Phenylene Oxide) and 3,3',5,5'-Tetramethyl-4,4'-Diphenoquinone", Journal of Polymer Science: Polymer Chemistry Edition, vol. 19, 1981, pp. 1367-1383.

(Continued)

*Primary Examiner* — Melissa Rioja
(74) *Attorney, Agent, or Firm* — Cantor Colburn LLP

(57) ABSTRACT

A polyurethane foam is prepared from a reaction mixture that includes an aromatic isocyanate compound, and blowing agent, and a polyol that itself includes a poly(phenylene ether) having a number average molecular weight of 600 to 2000 atomic mass units and an average of 1.5 to 3 hydroxyl groups per molecule. Use of the poly(phenylene ether) is associated with faster formation of polyurethane, and increased compression force deflection. The polyurethane is useful for forming articles including bedding, furniture, automotive interiors, mass transportation interiors (seating, padding, instrument panels, door panels, steering wheels, armrests, and headrests), flooring underlay (foam, rebond binder), packaging, textiles, lining and gasketing applications, acoustic dampening materials, and weather stripping.

16 Claims, No Drawings

(56) References Cited

OTHER PUBLICATIONS

Stepanpol Polyols, "Evolution in Formulation: An Overview for North and South America", 2012, 7 pages.
International Search Report dated Nov. 20, 2014; International Application No. PCT/US2014/048539; International Filing Date Jul. 29, 2014; (6 pages).
International Search Report dated Oct. 28, 2014; International Application No. PCT/US2014/043763; International Filing Date Jun. 24, 2014; 5 pages.
Written Opinion dated Nov. 20, 2014; International Application No. PCT/US2014/048539; International Filing Date Jul. 29, 2014 (5 pages).
Written Opinion dated Oct. 28, 2014; International Application No. PCT/US2014/043763; International Filing Date Jun. 24, 2014; 6 pages.
Notice of Allowance dated Jun. 25, 2015; U.S. Appl. No. 13/953,858, filed Jul. 30, 2013 (20 pages).
International Preliminary Report on Patentability dated Oct. 15, 2015, International Application No. PCT/US2014/043763, International Filing Date Jun. 24, 2014 (7 pages).

* cited by examiner

POLYURETHANE FOAM AND ASSOCIATED METHOD AND ARTICLE

BACKGROUND OF THE INVENTION

Polyurethanes are prepared from compounds with at least two hydroxyl groups and compounds with at least two isocyanate groups. See, e.g., D. Randall and S. Lee, "The Polyurethanes Book", New York: John Wiley & Sons, 2003; and K. Uhlig, "Discovering Polyurethanes", New York: Hanser Gardner, 1999. The isocyanate groups of the isocyanate compound react with the hydroxyl groups of the hydroxyl compound to form urethane linkages. In many cases, the hydroxyl compound is a low molecular weight polyether or polyester. The isocyanate compound can be aliphatic or aromatic, and in the preparation of linear polyurethanes is typically difunctional (i.e., it is a diisocyanate). However, isocyanate compounds with greater functionality are used in preparing thermoset polyurethanes. The family of polyurethane resins is very complex because of the enormous variation in the compositional features of the hydroxyl compounds and isocyanate compounds. This variety results in a large numbers of polymer structures and performance profiles. Indeed, polyurethanes can be rigid solids, soft and elastomeric, or a have a foam (cellular) structure.

Flexible polyurethane foams are used in applications including bedding, furniture, transportation interiors, carpet underlay, and packaging. However, there remains a desire for flexible polyurethane foams that exhibit one or more of increased rate of formation, increased compressive force deflection, increased tear strength, and increased tensile strength.

BRIEF SUMMARY OF EMBODIMENTS OF THE INVENTION

One embodiment is a polyurethane foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 65 to 95; and wherein the polyurethane foam has a density of 0.01 to 0.16 gram/centimeter$^3$ measured at 23° C. according to ASTM D 3574-08, Test A.

Another embodiment is an article comprising a polyurethane foam, the polyurethane foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 65 to 95; and wherein the polyurethane foam has a density of 0.01 to 0.16 gram/centimeter$^3$ measured at 23° C. according to ASTM D 3574-08, Test A.

Another embodiment is a method of forming a polyurethane foam, the method comprising: reacting a polyol with an aromatic isocyanate compound in the presence of a blowing agent to form a polyurethane foam; wherein the polyol comprises a poly(phenylene ether) having a number average molecular weight of 600 to 2000 atomic mass units and an average of 1.5 to 3 hydroxyl groups per molecule; wherein the aromatic isocyanate compound has an average of at least 2 isocyanate groups per molecule; wherein the reacting is characterized by an isocyanate index of 65 to 95; and wherein the polyurethane foam has a density of 0.01 to 0.16 gram/centimeter$^3$ measured at 23° C. according to ASTM D 3574-08, Test A.

These and other embodiments are described in detail below.

DETAILED DESCRIPTION OF THE INVENTION

The present inventor has determined that flexible polyurethane foams exhibiting one or more of increased rate of formation, increased compressive force deflection, increased tear strength, and increased tensile strength can be prepared from a polyol, an aromatic isocyanate compound, and a blowing agent, wherein the polyol comprises a low molecular weight, multifunctional poly(phenylene ether). The polyurethane-forming reactions are characterized by an isocyanate index of 65 to 95, and the resulting flexible foams have a density of 0.01 to 0.16 gram/centimeter$^3$.

Thus, one embodiment is a polyurethane foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 65 to 95; and wherein the polyurethane foam has a density of 0.01 to 0.16 gram/centimeter$^3$ measured at 23° C. according to ASTM D 3574-08, Test A.

The reaction mixture used to form the polyurethane foam comprises a polyol that itself comprises a poly(phenylene ether). As used herein, the term "polyol" refers to an organic compound with at least two hydroxyl groups. The poly(phenylene ether) has a number average molecular weight of 600 to 2000 atomic mass units. Within this range, the number average molecular weight can be 700 to 1500 atomic mass units, specifically 700 to 1200 atomic mass units. The poly(phenylene ether) also has an average of 1.5 to 3 hydroxyl groups per molecule. Within this range, the average hydroxyl groups per molecule can be 1.7 to 2.5, specifically 1.7 to 2.2.

In some embodiments, the poly(phenylene ether) comprises a hydroxy-diterminated poly(phenylene ether) having the structure

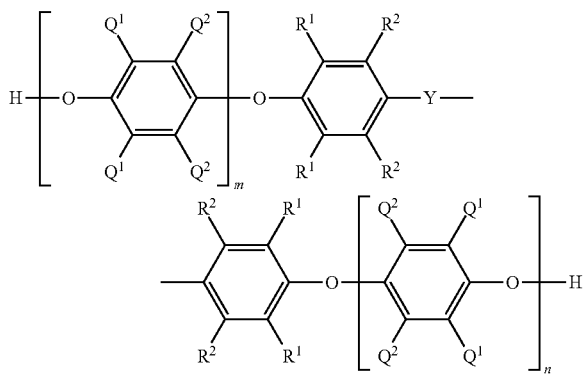

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

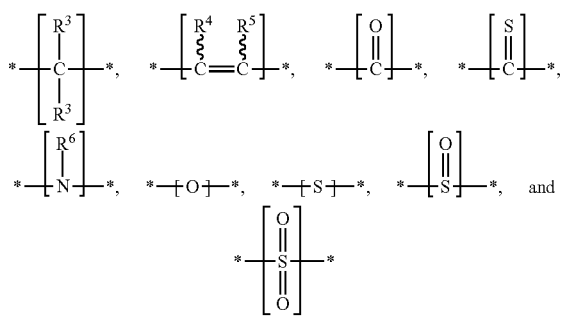

wherein each occurrence of $R^3$-$R^6$ is independently hydrogen or $C_1$-$C_{12}$ hydrocarbyl. The hydroxy-diterminated poly(phenylene ether) can be prepared by copolymerizing a dihydric phenol having the structure

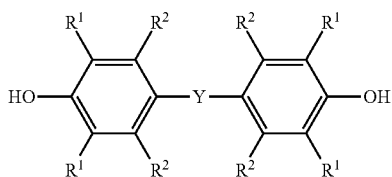

and a monohydric phenol having the structure

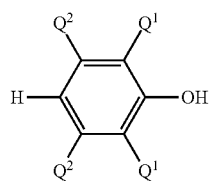

wherein $R^1$, $R^2$, $Q^1$, and $Q^2$ are defined above. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen.

In some embodiments, the poly(phenylene ether) comprises a hydroxy-diterminated poly(phenylene ether) having the structure

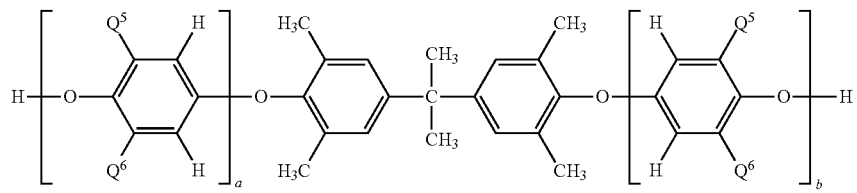

wherein each occurrence of $Q^5$ and $Q^6$ is independently methyl or di-n-butylaminomethyl, and each occurrence of a and b is independently 0 to 20, provided that the sum of a and b is at least 3. In these embodiments, the poly(phenylene ether) can be prepared by copolymerizing 2,2-bis(3,5-dimethyl-4-hydroxyphenyl)propane and 2,6-dimethylphenol in the presence of a catalyst comprising di-n-butylamine.

In some embodiments, the polyol consists of the poly(phenylene ether). In other embodiments, the polyol comprises the poly(phenylene ether) in an amount of 5 to 50 weight percent, based on the weight of the polyol. When the polyol does not consist of the poly(phenylene ether), it can further comprise one or more additional organic compounds containing at least two hydroxyl groups, such as diethylene glycol, diethanolamine, dipropylene glycol, ethoxylated glycerins, ethylene oxide capped polyether triols, propylene oxide capped polyether triols, and ethylene oxide capped polyether polyols.

In some embodiments, the reaction mixture comprises the polyol in an amount of 40 to 84 weight percent, based on the total weight of the polyol, the aromatic isocyanate compound, and the blowing agent. Within this range, the polyol amount can be 45 to 80 weight percent.

In addition to the polyol, the reaction mixture comprises an aromatic isocyanate compound having an average of at least 2 isocyanate groups per molecule. In some embodiments, the number of isocyanate groups per molecule is 2 to 4, specifically 2 to 3, more specifically 2 to 2.5. Specific examples of aromatic isocyanate compounds include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

In some embodiments, the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof.

In some embodiments, the reaction mixture comprises the aromatic isocyanate compound in an amount of 15 to 55 weight percent, based on the total weight of the polyol, the aromatic isocyanate compound, and the blowing agent. Within this range, the amount of the aromatic isocyanate compound can be 20 to 50 weight percent.

In addition to the polyol and the aromatic isocyanate compound, the reaction mixture comprises a blowing agent. Blowing agents useful in the method including physical blowing agents, chemical blowing agents, and combinations thereof. Physical blowing agents can be, for example, $C_3$-$C_5$ hydrofluoroalkanes and $C_3$-$C_5$ hydrofluoroalkenes. The hydrofluoroalkane and hydrofluoroalkene blowing agents can also contain one or more hydrogen atoms and/or halogen atoms other than fluorine. In some embodiments, the hydrofluoroalkane and hydrofluoroalkene blowing agents have a boiling point of 10 to 40° C. at 1 atmosphere. Specific physical blowing agents include 1,1-difluoroethane, 1,1,1,2-tetrafluoroethane, pentafluoroethane, 1,1,1,3,3-pentafluoropropane, 1,1,1,3,3-pentafluorobutane, 2-bromopentafluoropropene, 1-bromopentafluoropropene, 3-bromopentafluoropropene, 3,4,4,5,5,5-heptafluoro-1-pentene, 3-bromo-1,1,3,3-tetrafluoropropene, 2-bromo-1,3,3,3-tetrafluoropropene, 1-bromo-2,3,3,3-tetrafluoropropene, 1,1,2,3,3,4,4-heptafluorobut-1-ene, 2-bromo-3,3,3-trifluoropropene, E-1-bromo-3,3,3-trifluoropropene-1, (Z)-1,1,1,4,4,4-hexafluoro-2-butene, 3,3,3-trifluoro-2-(trifluoromethyl)propene, 1-chloro-3,3,3-trifluoropropene, 2-chloro-3,3,3-trifluoropropene, 1,1,1-fluoro-2-butene, and combinations thereof. The physical blowing agent, when used, can be present at 2 to 20 weight percent, based on the total weight of the polyol, the aromatic isocyanate compound, and the blowing agent. Within this range, the physical blowing agent amount can be 2.5 to 15 weight percent.

Chemical blowing agents include water and carboxylic acids that react with isocyanate groups to liberate carbon dioxide. When present, chemical blowing agents, and specifically water, can be used in an amount of 0.2 to 5 weight percent, based on the total weight of the polyol, the aromatic isocyanate compound, and the blowing agent. Within this range, the chemical blowing agent amount can be 0.2 to 3 weight percent.

The reaction mixture can, optionally, further include additives such as, for example, catalysts, surfactants, flame retardants, smoke suppressants, fillers and/or reinforcements, antioxidants, UV stabilizers, antistatic agents, infrared radiation absorbers, viscosity reducing agents, pigments, dyes, mold release agents, antifungal agents, biocides, and combinations thereof.

The polyurethane-forming reaction can be conducted in the absence of a catalyst for forming urethane linkages. Alternatively, the reaction can be conducted in the presence of a catalyst. Suitable catalysts include tertiary amines and metal compounds based on tin, bismuth, and zinc. Tertiary amine catalysts include triethylenediamine (TEDA), 1,4-diazabicyclo[2.2.2]octane (DABCO), dimethylcyclohexylamine (DMCHA), dimethylethanolamine (DMEA), N-ethylmorpholine, and combinations thereof. Specific metal compounds include bismuth and zinc carboxylates, organotin compounds (including dibutyltin dilaurate and tin carboxylates such as stannous octoate), oxides of tin, bismuth and zinc, and mercaptides of tin, bismuth, and zinc.

The reaction mixture can, optionally, further comprise a solvent. Suitable solvents include aromatic solvents, such as toluene, ethylbenzene, xylenes, anisole, chlorobenzene, dichlorobenzenes, and combinations thereof.

Alternatively, reacting the hydroxy-diterminated poly (phenylene ether) with the organic diisocyanate can be conducted in the absence of a solvent, that is, in bulk.

Surfactants include, for example, polyorganosiloxanes, polyorganosiloxane polyether copolymers, phenol alkoxylates (such as ethoxylated phenol), alkylphenol alkoxylates (such as ethoxylated nonylphenol), and combinations thereof. The surfactants can function as emulsifiers and/or foam stabilizers.

Flame retardants include, for example, organophosphorus compounds such as organic phosphates (including melamine phosphate, ammonium phosphate, trialkyl phosphates such as triethyl phosphate and tris(2-chloropropyl)phosphate, and triaryl phosphates such as triphenyl phosphate and diphenyl cresyl phosphate), phosphites (including trialkyl phosphites, triaryl phosphites, and mixed alkyl-aryl phosphites), phosphonates (including diethyl ethyl phosphonate, dimethyl methyl phosphonate), polyphosphates (including melamine polyphosphate, ammonium polyphosphates), pyrophosphates (including melamine pyrophosphate and ammonium pyrophosphate), polyphosphites, polyphosphonates, phosphinates (including aluminum tris(diethyl phosphinate)); melamine cyanurate; halogenated flame retardants such as tetrabromophthalate esters and chlorinated paraffins; metal hydroxides such as magnesium hydroxide, aluminum hydroxide, cobalt hydroxide, and hydrates of the foregoing metal hydroxides; and combinations thereof. The flame retardant can be a reactive type flame-retardant (including polyols which contain phosphorus groups, 10-(2,5-dihydroxyphenyl)-10H-9-oxa-10-phospha-phenanthrene-10-oxide, phosphorus-containing lactone-modified polyesters, ethylene glycol bis(diphenyl phosphate), neopentylglycol bis(diphenyl phosphate), amine- and hydroxyl-functionalized siloxane oligomers). These flame retardants can be used alone or in conjunction with other flame retardants.

When present, additives are typically used in a total amount of 0.01 to 30 weight percent, based on the total weight of the reaction mixture. Within this range, the total additive amount can be 0.02 to 10 weight percent.

The reaction mixture is characterized by an isocyanate index of 65 to 95. In general, reaction mixtures used to prepare polyurethane (and polyisocyanurate) foams are characterized by an isocyanate index, which is calculated according to the equation $$\text{Isocyanate Index} = \frac{Moles_{NCO}}{Moles_{OH} + Moles_{HOH} + Moles_{NH}} \times 100$$

wherein $Moles_{NCO}$ is the moles of isocyanate groups in the reaction mixture, $Moles_{OH}$ is the moles of OH groups in the reaction mixture from sources other than water (including OH groups from alcohols and carboxylic acids), Moles$_{HOH}$ is the moles of OH groups in the reaction mixture from water, and Moles$_{NH}$ is the moles of NH groups in the reaction mixture. The present the reaction mixture is characterized by an isocyanate index of 65 to 95, specifically 70 to 90.

The polyurethane foam has a density of 0.01 to 0.16 gram/centimeter$^3$ measured at 23° C. according to ASTM D 3574-08, Test A. Within this range, the density can be 0.02 to 0.12 gram/centimeter$^3$, specifically 0.02 to 0.08 gram/centimeter$^3$, more specifically 0.03 to 0.07 gram/centimeter$^3$.

To prepare the polyurethane foam, the polyol component and the isocyanate component, which have been temperature controlled and provided with additives, are thoroughly mixed together. The reaction starts after a short period of time and progresses with heat development. The reaction mixture is continually expanded by the blowing gases released, until the reaction product reaches the solid state as a result of progressive cross-linkage, the foam structure being retained.

The following stages are characteristic of the reaction and foaming process.

The mix time indicates the time needed for mixing the reactants.

The cream time is the time which elapses from the start of mixing of the reactants to the first definite appearance of foam expansion. In many cases this can be seen clearly by a color change as the reaction mixture begins to rise. With slow reacting mixtures this requires practiced observation.

The gel time is the interval of time between mixing the reactants and the formation of a non-flowing, semi-solid, jelly-like system. It is the time when the foam has developed enough gel strength to be dimensionally stable. After the gel time, the speed at which the foam rises slows down.

The rise time is the time from the start of mixing until the end of the optically perceptible rise. Hence it is the time until foam expansion ceases. The surface of the foam is still tacky when the rise process is complete.

The tack-free time is the time elapsing from the start of mixing to the moment when the foam surface has cured sufficiently that its surface is no longer tacky or sticky. The moment of freedom from tack can be determined by repeatedly testing the foam surface with a wooden rod.

In a very specific embodiment of the polyurethane foam, the reaction mixture comprises 40 to 84 weight percent, specifically 45 to 80 weight percent, of the polyol, including 5 to 35 weight percent, specifically 10 to 30 weight percent, more specifically 15 to 25 weight percent, of the poly(phenylene ether); 15 to 55 weight percent, specifically 20 to 50 weight percent, of the aromatic isocyanate compound; and 1 to 5 weight percent, specifically 2 to 4 weight percent, more specifically 2 to 3 weight percent, of the blowing agent; wherein all weight percents are based on the total weight of the polyol, the aromatic isocyanate compound, and the blowing agent.

In another very specific embodiment of the polyurethane foam, the poly(phenylene ether) is a copolymer of monomers comprising 2,6-dimethylphenol and 2,2-bis(3,5-dimethyl-4-hydroxyphenyl)propane; the polyol further comprises an ethylene oxide capped polyether triol, a propylene oxide capped polyether triol, an ethylene oxide capped polyether polyol, or a combination thereof, the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; the blowing agent comprises water; and the reaction mixture comprises 40 to 84 weight percent of the polyol, including 5 to 35 weight percent of the poly(phenylene ether); 15 to 55 weight percent of the aromatic isocyanate compound; and 1 to 5 weight percent of the blowing agent; wherein all weight percents are based on the total weight of the polyol, the aromatic isocyanate compound, and the blowing agent.

The invention includes an article comprising the polyurethane foam. Thus, one embodiment is an article comprising a polyurethane foam, the polyurethane foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 65 to 95; and wherein the polyurethane foam has a density of 0.01 to 0.16 gram/centimeter$^3$ measured at 23° C. according to ASTM D 3574-08, Test A.

Specific articles comprising the polyurethane foam include bedding, furniture, automotive interiors, mass transportation interiors (seating, padding, instrument panels, door panels, steering wheels, armrests, and headrests), flooring underlay (foam, rebond binder), packaging, textiles, lining and gasketing applications, acoustic dampening materials, and weather stripping.

In some embodiments, the article is prepared by a slabstock foam process. In this process, the raw materials are mixed, poured onto a moving conveyor, and allowed to react and expand. The resulting foam rises to form a "slab" that is typically from two to four feet high. The continuous slab is then cut into "buns", stored, and allowed to cure for up to 24 hours. The cured foam is subsequently fabricated into useful shapes. The slabstock process can be used for foams employed in furniture, bedding and carpet cushion. The slabstock process is an example of free rise foaming.

In other embodiments, the article is prepared by a molded foam process. In the molded foam process, the raw materials are mixed and poured into specially shaped molds where the foam reaction takes place. Hence, molded foam is a cellular foam product having the shape of the mold cavity in which it was produced. The molded foam process can be used for automotive cushioning, contract furniture cushioning, and cushioning for residential upholstered designs.

In a very specific embodiment of the article, the poly(phenylene ether) is a copolymer of monomers comprising 2,6-dimethylphenol and 2,2-bis(3,5-dimethyl-4-hydroxyphenyl)propane; the polyol further comprises an ethylene oxide capped polyether triol, a propylene oxide capped polyether triol, an ethylene oxide capped polyether polyol, or a combination thereof; the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; the blowing agent comprises water; and the reaction mixture comprises 40 to 84 weight percent of the polyol, including 5 to 35 weight percent of the poly(phenylene ether); 15 to 55 weight percent of the aromatic isocyanate compound; and 1 to 5 weight percent of the blowing agent; wherein all weight percents are based on the total weight of the polyol, the aromatic isocyanate compound, and the blowing agent.

The invention includes a method of forming the polyurethane foam. Thus, one embodiment is a method of forming a polyurethane foam, the method comprising: reacting a polyol with an aromatic isocyanate compound in the presence of a blowing agent to form a polyurethane foam; wherein the poly(phenylene ether) having a number average molecular weight of 600 to 2000 atomic mass units and an average of 1.5 to 3 hydroxyl groups per molecule; wherein the aromatic isocyanate compound has an average of at least 2 isocyanate groups per molecule; wherein the reacting is characterized by an isocyanate index of 65 to 95; and wherein the polyurethane foam has a density of 0.01 to 0.16 gram/centimeter$^3$ measured at 23° C. according to ASTM D 3574-08, Test A.

In a specific embodiment of the method, based on the total weight of the polyol, the aromatic isocyanate compound, and the blowing agent, the polyol is used in an amount of 40 to 84 weight percent, including 5 to 35 weight percent of the poly (phenylene ether); the aromatic isocyanate compound is used in an amount of 15 to 55 weight percent, and the blowing agent is used in an amount of 1 to 5 weight percent.

In the working examples below, the exothermic reactions were initiated at ambient temperature. In general, the reaction temperature can be adjusted to maximize production rate and account for the exothermicity of the reaction.

In another specific embodiment of the method, the poly (phenylene ether) is a copolymer of monomers comprising 2,6-dimethylphenol and 2,2-bis(3,5-dimethyl-4-hydroxyphenyl)propane; the polyol further comprises an ethylene oxide capped polyether triol, a propylene oxide capped polyether triol, an ethylene oxide capped polyether polyol, or a combination thereof; the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; the blowing agent comprises water; and, based on the total weight of the polyol, the aromatic isocyanate compound, and the blowing agent, the polyol is used in an amount of 40 to 84 weight percent, including 5 to 35 weight percent of the poly (phenylene ether); the aromatic isocyanate compound is used in an amount of 15 to 55 weight percent, and the blowing agent is used in an amount of 1 to 5 weight percent.

All ranges disclosed herein are inclusive of the endpoints, and the endpoints are independently combinable with each other. Each range disclosed herein constitutes a disclosure of any point or sub-range lying within the disclosed range.

The invention includes at least the following embodiments.

Embodiment 1: A polyurethane foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 65 to 95; and wherein the polyurethane foam has a density of 0.01 to 0.16 gram/centimeter$^3$ measured at 23° C. according to ASTM D 3574-08, Test A.

Embodiment 2: The polyurethane foam of embodiment 1, wherein the poly(phenylene ether) is a copolymer of monomers comprising a monohydric phenol and a dihydric phenol.

Embodiment 3: The polyurethane foam of embodiment 2, wherein the monohydric phenol comprises 2,6-dimethylphenol and the dihydric phenol comprises 2,2-bis(3,5-dimethyl-4-hydroxyphenyl)propane.

Embodiment 4: The polyurethane foam of any of embodiments 1-3, wherein the polyol comprises the poly(phenylene ether) in an amount of 5 to 50 weight percent, based on the weight of the polyol.

Embodiment 5: The polyurethane foam of any of embodiments 1-4, wherein the polyol further comprises an ethylene oxide capped polyether triol, a propylene oxide capped polyether triol, an ethylene oxide capped polyether polyol, or a combination thereof.

Embodiment 6: The polyurethane foam of any of embodiments 1-5, wherein the aromatic isocyanate compound comprises 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

Embodiment 7: The polyurethane foam of any of embodiments 1-5, wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof.

Embodiment 8: The polyurethane foam of any of embodiments 1-7, wherein the blowing agent comprises water.

Embodiment 9: The polyurethane foam of any of embodiments 1-8, wherein the reaction mixture further comprises a catalyst for forming urethane linkages.

Embodiment 10: The polyurethane foam of any of embodiments 1-9, wherein the reaction mixture comprises 40 to 84 weight percent of the polyol, including 5 to 35 weight percent of the poly(phenylene ether); 15 to 55 weight percent of the aromatic isocyanate compound; and 1 to 5 weight percent of the blowing agent; wherein all weight percents are based on the total weight of the polyol, the aromatic isocyanate compound, and the blowing agent.

Embodiment 11: The polyurethane foam of embodiment 1, wherein the poly(phenylene ether) is a copolymer of monomers comprising 2,6-dimethylphenol and 2,2-bis(3,5-dimethyl-4-hydroxyphenyl)propane; wherein the polyol further comprises an ethylene oxide capped polyether triol, a propylene oxide capped polyether triol, an ethylene oxide capped polyether polyol, or a combination thereof; wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; wherein the blowing agent comprises water; and wherein the reaction mixture comprises 40 to 84 weight percent of the polyol, including 5 to 35 weight percent of the poly(phenylene ether); 15 to 55 weight percent of the aromatic isocyanate compound; and 1 to 5 weight percent of the blowing agent; wherein all weight percents are based on the total weight of the polyol, the aromatic isocyanate compound, and the blowing agent.

Embodiment 12: An article comprising a polyurethane foam, the polyurethane foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 65 to 95; and wherein the polyurethane foam has a density of 0.01 to 0.16 gram/centimeter$^3$ measured at 23° C. according to ASTM D 3574-08, Test A.

Embodiment 13: The article of embodiment 12, selected from the group consisting of bedding, furniture, automotive interiors, mass transportation interiors (seating, padding, instrument panels, door panels, steering wheels, armrests, and headrests), flooring underlay (foam, rebond binder), packaging, textiles, lining and gasketing applications, acoustic dampening materials, and weather stripping.

Embodiment 14: The article of embodiment 12 or 13, wherein the poly(phenylene ether) is a copolymer of monomers comprising 2,6-dimethylphenol and 2,2-bis(3,5-dimethyl-4-hydroxyphenyl)propane; wherein the polyol further comprises an ethylene oxide capped polyether triol, a propylene oxide capped polyether triol, an ethylene oxide capped polyether polyol, or a combination thereof; wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; wherein the blowing agent comprises water; and wherein the reaction mixture comprises 40 to 84 weight percent of the polyol, including 5 to 35 weight percent of the poly(phenylene ether); 15 to 55 weight percent of the aromatic isocyanate compound; and 1 to 5 weight percent of the blowing agent; wherein all weight percents are based on the total weight of the polyol, the aromatic isocyanate compound, and the blowing agent.

Embodiment 15: A method of forming a polyurethane foam, the method comprising: reacting a polyol with an aromatic isocyanate compound in the presence of a blowing agent to form a polyurethane foam; wherein the polyol comprises a poly(phenylene ether) having a number average molecular weight of 600 to 2000 atomic mass units and an average of 1.5 to 3 hydroxyl groups per molecule; wherein the aromatic isocyanate compound has an average of at least 2 isocyanate groups per molecule; wherein the reacting is characterized by an isocyanate index of 65 to 95; and wherein the polyurethane foam has a density of 0.01 to 0.16 gram/centimeter$^3$ measured at 23° C. according to ASTM D 3574-08, Test A.

Embodiment 16: The method of embodiment 15, wherein, based on the total weight of the polyol, the aromatic isocyanate compound, and the blowing agent, the polyol is used in an amount of 40 to 84 weight percent, including 5 to 35 weight percent of the poly(phenylene ether); the aromatic isocyanate compound is used in an amount of 15 to 55 weight percent, and the blowing agent is used in an amount of 1 to 5 weight percent.

Embodiment 17: The method of embodiment 15, wherein the poly(phenylene ether) is a copolymer of monomers comprising 2,6-dimethylphenol and 2,2-bis(3,5-dimethyl-4-hydroxyphenyl)propane; wherein the polyol further comprises an ethylene oxide capped polyether triol, a propylene oxide capped polyether triol, an ethylene oxide capped polyether polyol, or a combination thereof, wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; wherein the blowing agent comprises water; and wherein, based on the total weight of the polyol, the aromatic isocyanate compound, and the blowing agent, the polyol is used in an amount of 40 to 84 weight percent, including 5 to 35 weight percent of the poly (phenylene ether); the aromatic isocyanate compound is used in an amount of 15 to 55 weight percent, and the blowing agent is used in an amount of 1 to 5 weight percent.

The invention is further illustrated by the following non-limiting examples.

EXAMPLES 1-26, COMPARATIVE EXAMPLES 1-8

Raw materials used in these examples are summarized in Table 1. All materials were used as received from suppliers.

TABLE 1

| Material | Description |
| --- | --- |
| PPE-2OH | A copolymer of 2,6-dimethylphenol and 2,2-bis(3,5-dimethyl-4-hydroxyphenyl)propane, CAS Reg. No. 1012321-47-9, having a hydroxyl equivalent weight of 924 grams per equivalent, an average of 1.92 hydroxyl groups per molecule, and an intrinsic viscosity of 0.09 deciliters per gram as measured at 25° C. in chloroform; available as NORYL ™ SA90 Resin from SABIC Innovative Plastics. |
| POLY-G ™ 85-29 | Ethylene oxide capped polyether triol; hydroxyl value = 28.1 mg KOH/g; hydroxyl equivalent weight = 1996.4 grams per equivalent; available from Arch Chemicals Inc. |
| POLY-G ™ 30-240 | Oxypropylated polyether triol; hydroxyl value = 238 mg KOH/g; hydroxyl equivalent weight = 235.7 grams per equivalent; available from Arch Chemicals Inc. |
| POLY-G ™ 76-120 | Ethylene oxide capped polyether triol; hydroxyl value = 119.3 mg KOH/g; hydroxyl equivalent weight. = 462.9 grams per equivalent; available from Arch Chemicals Inc. |
| POLY-G ™ 85-34 | Ethylene oxide capped polyether triol; hydroxyl value = 35 mg KOH/g; hydroxyl equivalent weight = 1602.9 grams per equivalent; available from Arch Chemicals Inc. |
| VORANOL ™ | A catalytically active, high-functionality EO Capped Polyether Polyol; |

TABLE 1-continued

| Material | Description |
|---|---|
| VORACTIV ™ 6340 | hydroxyl value = 32 mg KOH/g; hydroxyl equivalent weight = 1753.13 grams per equivalent; water content = 0.031% grams per equivalent; available from Dow Chemical Company |
| LUMULSE ™ POE 26 | Ethoxylated Glycerin; hydroxyl value = 134.8 mg KOH/g; hydroxyl equivalent weight = 416.2 grams per equivalent; available from Lambent Technologies |
| TEGOSTAB ™ B 4690 | Polyether/Silicone Oil Mix; equivalent weight = 1335.7 grams per equivalent of hydroxyl groups; available from Evonik Industries |
| TEGOSTAB ™ B8871 | Polyether/Silicone Oil Mix; equivalent weight = 561 grams per equivalent of hydroxyl groups; available from Evonik Industries |
| Diethylene Glycol | Diethylene Glycol; equivalent weight = 53.1 grams per equivalent; available from Sigma-Aldrich Corporation |
| Diethanolamine | Diethanolamine; equivalent weight = 35.04 grams per equivalent; available from Sigma-Aldrich Corporation |
| CATALYSTS | |
| DABCO ™ 33LV | 33% Triethylenediamine in dipropylene glycol; available from Air Products |
| NIAX ™ A1 | Bis(2-dimethylaminoethyl) ether; available from Momentive Specialty Chemicals Inc. |
| DIISOCYANATES | |
| MONDUR ™ MRS-2 | Diphenylmethane diisocyanate, enriched in 2,4'-diphenylmethane diisocyanate; average functionality = 2.2 isocyanate groups per molecule; equivalent weight = 128.8 grams per equivalent; 32.6 weight percent isocyanate; available from Bayer MaterialScience |
| LUPRANATE ™ T80 Type 1 | Toluene diisocyanate; equivalent weight = 87.54 grams per equivalent; available from BASF |

For the purpose of calculating polyol content, the contributions of PPE-2OH, POLY-G™ 85-29, POLY-G™ 30-240, POLY-G™ 76-120, POLY-G™ 85-34, VORANOL™ VORACTIV™ 6340, LUMULSE™ POE 26, TEGOSTAB™ B 4690, TEGOSTAB™ B8871, Diethylene Glycol, Diethanolamine, and DABCO™ 33LV were counted. It should be noted that LUMULSE™ POE 26 also functions as a cell opener, TEGOSTAB™ B 4690 and TEGOSTAB™ B8871 also function as surfactants, Diethylene Glycol and Diethanolamine also function as chain extenders, and DABCO™ 33LV also functions as a catalyst.

All foams were prepared using a high-torque mixer (CRAFSTMAN™ 10-Inch Drill Press, Model No. 137.219000) at 3,100 rotations per minute (rpm) speed. In the case of high resilient foams, polyol components and isocyanate components of the foam systems were mixed for 7 or 10 seconds as noted in the Examples. Then the mixture was transferred into an open polyethylene container and allowed to free-rise. Foaming profiles, including cream time, gel time, and rise time were measured on all foams. After the rise time, the foams were immediately placed in an air-circulating oven for completion of cure (post-cure). Post-cured conditions (time and temperature) appear in the Examples and Comparative Examples.

All foams were aged under room conditions for minimum one week before testing as noted in the Examples. The following properties were measured according to ASTM D 3574-08:

Foam Density (Test A)
Resilience via Ball Rebound (Test H)
Tensile Strength at Break (Test E)
Elongation at Break (Test E)
Tear Strength (Test F)
CFD, Compression Force Deflection (Test C)
Hysteresis (Procedure B—CFD Hysteresis Loss)
Dry Constant Deflection Compression Set (Test D)
Wet Constant Deflection Compression Set (Test D & Wet Heat Aging, Test L).

Flammability was measured as Horizontal Burning Rate according to an in-house method, which was modified from ASTM D 5132-04. However, in all foams the dripping was observed during the flammability test.

Comparative Example 1 was used as a model formulation targeting high resilient flexible foams and was based on POLY-G™ 85-36 ethylene oxide capped polyether triol (polyol), LUMULSE™ POE 26 (ethoxylated glycerol) as a reactive cell opener, diethanolamine as a co-catalyst/cross-linker, and MONDUR™ MRS-2 as a diisocyanate.

The formulations in Comparative Example 1, and Examples 1, 2, 3, and 4 were prepared with 0%, 10%, 20%, 30%, and 40% PPE-2OH, respectively. These free-rise, water-blown foams were prepared with 3.6 parts by weight water and an isocyanate index of 90. Formulations, reaction profiles, and properties appear in Table 2.

TABLE 2

| | C. Ex. 1 | Ex. 1 | Ex. 2 | Ex. 3 | Ex. 4 |
|---|---|---|---|---|---|
| PPE-2OH content (wt % based on total polyol) | 0 | 10 | 20 | 30 | 40 |
| PPE-2OH content (wt % based on total reactants) | 0 | 6.1 | 12.2 | 18.2 | 24.2 |
| Polyol System | | | | | |
| POLY-G ™ 85-29 | 97 | 87 | 77 | 67 | 57 |
| PPE-2OH | 0 | 10 | 20 | 30 | 40 |

TABLE 2-continued

|  | C. Ex. 1 | Ex. 1 | Ex. 2 | Ex. 3 | Ex. 4 |
|---|---|---|---|---|---|
| LUMULSE ™ POE 26 | 3 | 3 | 3 | 3 | 3 |
| Water | 3.6 | 3.6 | 3.6 | 3.6 | 3.6 |
| Diethanolamine | 1 | 1 | 1 | 1 | 1 |
| TEGOSTAB ™ B 4690 | 1 | 1 | 1 | 1 | 1 |
| DABCO ™ 33LV | 0.8 | 0.8 | 0.8 | 0.8 | 0.8 |
| Isocyanate System |  |  |  |  |  |
| MONDUR ™ MRS-2 | 57.18 | 57.87 | 58.53 | 59.2 | 59.88 |
| Isocyanate Index | 90 | 90 | 90 | 90 | 90 |
| Reaction Profile of Free-rise |  |  |  |  |  |
| Size of Foam (grams) | 100 | 100 | 100 | 100 | 100 |
| Mix time (sec) | 7 | 7 | 7 | 7 | 7 |
| Cream time (sec) | 13 | 12 | 10 | 9 | 8 |
| Gel time (sec) | 18 | 16 | 15 | 13 | 11 |
| Off-gassing time (sec) | 74 | 65 | 53 | 48 | 40 |
| Post-curing time & temperature | 30 min @ 80° C. | 30 min @ 80° C. | 30 min @ 80° C. | 30 min @ 80° C. | 30 min @ 80° C. |
| Properties |  |  |  |  |  |
| Free-rise density (grams/cc) | 0.0362 | 0.0381 | 0.0346 | 0.0376 | 0.0366 |
| Resilience (%) | 51 | 47 | 45 | 40 | 37 |
| CFD @ 25% (kPa) | 1.45 | 2.14 | 2.21 | 3.38 | 4.55 |
| CFD @ 50% (kPa) | 2.62 | 4.14 | 4.21 | 7.24 | 10.27 |
| CFD @ 65% (kPa) | 4.83 | 8.00 | 8.07 | 14.96 | 20.96 |
| Tensile Strength (kPa) | 102.3 | 106.5 | 110.0 | 117.7 | 133.6 |
| Elongation at Break (%) | 121 | 87 | 77 | 70 | 149 |
| Tear Strength (N/m) | 530 | 573 | 583 | 613 | 612 |
| Dry Compression @ 70° C. (%) | 4.2 | — | 7.0 | — | — |
| Wet Compression @ 50° C. (%) | 6.5 | — | 18.5 | — | — |
| Hysteresis | 38 | 43 | 48 | 49 | 57 |
| Flammability-Burn rate (mm/min) | 104 | 108 | 116 | 107 | 104 |

The reactivity increased with increasing poly(phenylene ether) content, as indicated by reduced cream time, gel time, and off-gassing time values. The compression force deflection (CFD) values increased significantly with increasing poly(phenylene ether) content, as did tensile and tear strength values. The increased CFD, tensile, and tear strength values indicate that the poly(phenylene ether) has the potential to increase load bearing properties and toughness in flexible foams.

The formulations in Comparative Example 2, and Examples 5, 6, 7, and 8 targeted MDI based memory foam. Free rise water-blown foams were prepared with 0, 10, 15, 20, and 30% poly(phenylene ether) and an isocyanate index of 70. Formulations, reaction profiles, and properties are summarized in Table 3.

TABLE 3

|  | C. Ex. 2 | Ex. 5 | Ex. 6 | Ex. 7 | Ex. 8 |
|---|---|---|---|---|---|
| PPE-2OH content (wt % based on total polyol) | 0 | 10 | 15 | 20 | 30 |
| PPE-2OH content (wt % based on total reactants) | 0 | 6.4 | 9.7 | 13.1 | 19.8 |
| Polyol System |  |  |  |  |  |
| PPE-2OH | 0 | 10 | 15 | 20 | 30 |
| POLY-G ™ 30-240 | 21 | 21 | 21 | 16 | 11 |
| POLY-G ™ 76-120 | 21 | 16 | 11 | 11 | 9 |
| POLY-G ™ 85-34 | 18 | 13 | 13 | 13 | 10 |
| LUMULSE ™ POE 26 | 40 | 40 | 40 | 40 | 40 |
| Diethylene Glycol | 2.25 | 2.25 | 2.25 | 2.25 | 2.25 |
| Water | 2.3 | 2.3 | 2.3 | 2.3 | 2.3 |
| TEGOSTAB ™ B8871 | 1.5 | 1.5 | 1.5 | 1.5 | 1.5 |
| DABCO ™ 33LV | 0.1 | 0.1 | 0.1 | 0.1 | 0.1 |
| NIAX ™ A1 | 0.2 | 0.2 | 0.2 | 0.2 | 0.2 |
| Isocyanate System |  |  |  |  |  |
| MONDUR ™ MRS-2 | 49.08 | 48.8 | 48.32 | 46.89 | 45.38 |
| Isocyanate Index | 70 | 70 | 70 | 70 | 70 |
| Reaction Profile of Free-rise |  |  |  |  |  |
| Size of Foam (grams) | 100 | 100 | 100 | 100 | 100 |
| Mix time (sec) | 10 | 10 | 10 | 10 | 10 |
| Cream time (sec) | 17 | 18 | 17 | 16 | 15 |
| Gel time (sec) | 34 | 30 | 27 | 26 | 23 |
| Rise time (sec) | 125 | 129 | 98 | 80 | 78 |

TABLE 3-continued

|  | C. Ex. 2 | Ex. 5 | Ex. 6 | Ex. 7 | Ex. 8 |
|---|---|---|---|---|---|
| Post-curing time & temperature | 60 min @ 70° C. | 60 min @ 70° C. | 60 min @ 70° C. | 60 min @ 70° C. | 60 min @ 70° C. |
| Properties |  |  |  |  |  |
| Free-rise density (grams/cc) | 0.0499 | 0.0440 | 0.0451 | 0.0502 | 0.0529 |
| Resilience (%) | <1 | <1 | <1 | <1 | 0.71 |
| CFD @ 25% (kPa) | 0.345 | 0.414 | 0.483 | 0.552 | 0.621 |
| CFD @ 50% (kPa) | 0.552 | 0.758 | 0.827 | 0.896 | 1.172 |
| CFD @ 65% (kPa) | 0.896 | 1.310 | 1.448 | 1.586 | 2.275 |
| Tensile Strength (kPa) | 9.78 | 11.79 | 15.74 | 13.95 | 7.92 |
| Elongation at Break (%) | 336 | 205 | 182 | 172 | 190 |
| Tear Strength (N/m) | 310 | 429 | 587 | 473 | 472 |

The reactivity increased with increasing poly(phenylene ether) content, as evidenced by cream time, gel time, and rise time values. Increasing poly(phenylene ether) content was also associated with increasing compression force deflection (CFD) values. Incorporation of poly(phenylene ether) was also associated with increased tensile and tear strength values, particularly at intermediate poly(phenylene ether) contents. The increased CFD values indicate that the poly(phenylene ether) has potential to impart load bearing properties to the flexible foams.

The formulations in Comparative Example 3, and Examples 9, 10, and 11 targeted MDI-based memory foam. Free rise water-blown foams were prepared with 0, 10, 20, and 30% poly(phenylene ether) and an isocyanate index of 80. Formulations, reaction profiles, and properties are summarized in Table 4.

TABLE 4

|  | C. Ex. 3 | Ex. 9 | Ex. 10 | Ex. 11 |
|---|---|---|---|---|
| PPE-2OH content (wt % based on total polyol) | 0 | 10 | 20 | 30 |
| PPE-2OH content (wt % based on total reactants) | 0 | 6.2 | 12.5 | 18.9 |
| Polyol System |  |  |  |  |
| PPE-2OH | 0 | 10 | 20 | 30 |
| POLY-G ™ 30-240 | 21 | 21 | 16 | 11 |
| POLY-G ™ 76-120 | 21 | 16 | 11 | 9 |
| POLY-G ™ 85-34 | 18 | 13 | 13 | 10 |
| LUMULSE ™ POE 26 | 40 | 40 | 40 | 40 |
| Diethylene Glycol | 2.25 | 2.25 | 2.25 | 2.25 |
| Water | 2.3 | 2.3 | 2.3 | 2.3 |
| TEGOSTAB ™ B8871 | 1.5 | 1.5 | 1.5 | 1.5 |
| DABCO ™ 33LV | 0.1 | 0.1 | 0.1 | 0.1 |
| NIAX ™ A1 | 0.2 | 0.15 | 0.15 | 0.15 |
| Isocyanate System |  |  |  |  |
| MONDUR ™ MRS-2 | 56.09 | 55.75 | 53.57 | 51.86 |
| Isocyanate Index | 80 | 80 | 80 | 80 |
| Reaction Profile of Free-rise |  |  |  |  |
| Size of Foam (grams) | 100 | 100 | 100 | 100 |
| Mix time (sec) | 10 | 10 | 10 | 10 |
| Cream time (sec) | 20 | 19 | 15 | 14 |
| Gel time (sec) | 30 | 31 | 28 | 24 |
| Rise time (sec) | 150 | 122 | 70 | 66 |
| Post-curing time & temperature | 60 min @ 70° C. | 60 min @ 70° C. | 60 min @ 70° C. | 60 min @ 70° C. |
| Properties |  |  |  |  |
| Free-rise density (grams/cc) | 0.0484 | 0.0455 | 0.046 | 0.0524 |
| Resilience (%) | 1 | 0.71 | 1.32 | 2.74 |
| CFD @ 25% (kPa) | 1.17 | 1.10 | 1.24 | 3.38 |
| CFD @ 50% (kPa) | 1.65 | 1.59 | 2.00 | 5.31 |
| CFD @ 65% (kPa) | 2.62 | 2.55 | 3.59 | 9.24 |
| Tensile Strength (kPa) | 19.32 | 15.47 | 16.47 | 14.14 |
| Elongation at Break (%) | 200 | 197 | 134 | 146 |
| Tear Strength (N/m) | 574 | 563 | 651 | 867 |
| Dry Compression @ 70° C. (%) | 0.8 | — | 2.1 | — |
| Wet Compression @ 50° C. (%) | 0.6 | — | 2.8 | — |
| Flammability-Burn rate (mm/min) | 69 | — | 73 | — |

The reactivity increased with increasing poly(phenylene ether) content, as evidenced by cream time, gel time, and rise time values. Increasing poly(phenylene ether) content was also associated with increasing compression force deflection (CFD) values.

Toluene diisocyanate (TDI) based flexible forms were prepared. The formulations in Table 5 were based on a combination of POLY-G™ 85-36 ethylene oxide capped polyether triol (polyol) and VORANOL™-VORACTIVE™ 6340 a catalytically active, high-functionality ethylene oxide capped polyether polyol. LUMULSE™ POE 26 (ethoxylated glycerol) was used as a reactive cell opener, diethanolamine as a co-catalyst/cross-linker, and LUPRANATE™ T80 Type 1 as an isocyanate.

The formulations in Comparative Example 4, and Example 12, 13, and 14 targeted high resilient flexible foams. Free rise water-blown foams were prepared with 0, 10, 20, and 30% poly(phenylene ether), all at an isocyanate index of 90. Formulations, reaction profiles, and properties free-rise foams prepared with 3.6 parts by weight of water as a blowing agent are summarized in Table 5.

poly(phenylene ether) is part of the formulation indicate improvements in load bearing properties and toughness of the foams.

Three formulations were evaluated in molded foams. Molded foams were prepared using an aluminum mold with 30.48×30.48×5.08 centimeter (12×12×2 inch) dimensions. The mold was preheated at 80° C. After the mixture was poured into the mold a floating lid was placed on top with 0.4 megapascal pressure. De-molding time was about 4.5 minutes.

The formulations in Comparative Example 5, and Examples 15 and 16 were used to prepare molded high resilient flexible foams as described in the previous paragraph. The molded foams were prepared with 0, 10, and 20% poly (phenylene ether), with 3.6 parts by weight of water as a blowing agent, and an isocyanate index of 90. Formulations, curing conditions, and properties of the molded foams are summarized in Table 6.

TABLE 5

|  | C. Ex. 4 | Ex. 12 | Ex. 13 | Ex. 14 |
|---|---|---|---|---|
| PPE-2OH content (wt % based on total polyol) | 0 | 10 | 20 | 30 |
| PPE-2OH content (wt % based on total reactants) | 0 | 6.88 | 13.71 | 20.51 |
| Polyol System |  |  |  |  |
| POLY-G ™ 85-29 | 48.5 | 43.5 | 38.5 | 33.5 |
| VORANOL ™ VORACTIV ™ 6340 | 48.5 | 43.5 | 38.5 | 33.5 |
| PPE-2OH | 0 | 10 | 20 | 30 |
| Water | 3.6 | 3.6 | 3.6 | 3.6 |
| LUMULSE ™ POE 26 | 3 | 3 | 3 | 3 |
| TEGOSTAB ™ B 4690 | 1 | 1 | 1 | 1 |
| DABCO ™ 33LV | 0.5 | 0.5 | 0.5 | 0.5 |
| Diethanolamine | 1 | 1 | 1 | 1 |
| NIAX ™ A1 | 0.05 | 0.05 | 0.05 | 0.05 |
| Isocyanate System |  |  |  |  |
| LUPRANATE ™ T80 Type 1 | 38.81 | 39.25 | 39.69 | 40.12 |
| Isocyanate Index | 90 | 90 | 90 | 90 |
| Reaction Profile of Free-rise |  |  |  |  |
| Size of Foam (grams) | 100 | 100 | 100 | 100 |
| Mix time (sec) | 5 | 5 | 5 | 5 |
| Cream time (sec) | 9 | 12 | 9 | 6 |
| Gel time (sec) | 32 | 24 | 22 | 20 |
| Rise time (sec) | 79 | 92 | 84 | 65 |
| Post-curing time & temperature | 20 min @ 70° C. | 20 min @ 70° C. | 20 min @ 70° C. | 20 min @ 70° C. |
| Properties |  |  |  |  |
| Free-rise density (grams/cc) | 0.0242 | 0.0292 | 0.0287 | 0.0316 |
| Resilience (%) | 60 | 54 | 33 | 27 |
| CFD @ 25% (kPa) | 0.76 | 0.83 | 2.14 | 2.48 |
| CFD @ 50% (kPa) | 1.31 | 1.65 | 4.48 | 4.90 |
| CFD @ 65% (kPa) | 2.21 | 3.17 | 8.48 | 8.89 |
| Tensile Strength (kPa) | 8.82 | 12.28 | 19.33 | 23.2 |
| Elongation at Break (%) | 228 | 188 | 146 | 118 |
| Tear Strength (N/m) | 412 | 438 | 857 | 921 |
| Dry Compression @ 70° C. (%) | 7.1 | 6.7 | 13.8 | 27 |
| Wet Compression @ 50° C. (%) | 8 | 17.1 | 45.9 | 47.1 |

The reactivity of the foaming system increased with increasing poly(phenylene ether) content, as indicated by generally reduced cream time, gel time, and rise time values. Tensile and tear strength values also increased with increasing poly(phenylene ether) content. The compression force deflection (CFD) values measured at 25%, 50%, and 65% deflection increased significantly with increasing poly(phenylene ether) contents. These property improvements when

TABLE 6

|  | C. Ex. 5 | Ex. 15 | Ex. 16 |
|---|---|---|---|
| PPE-2OH content (wt % based on total polyol) | 0 | 10 | 20 |
| PPE-2OH content (wt % based on total reactants) | 0 | 6.88 | 13.71 |

TABLE 6-continued

|  | C. Ex. 5 | Ex. 15 | Ex. 16 |
|---|---|---|---|
| Polyol System |  |  |  |
| POLY-G ™ 85-29 | 48.5 | 43.5 | 38.5 |
| VORANOL ™ VORACTIV ™ 6340 | 48.5 | 43.5 | 38.5 |
| PPE-2OH | 0 | 10 | 20 |
| Water | 3.6 | 3.6 | 3.6 |
| LUMULSE ™ POE 26 | 3 | 3 | 3 |
| TEGOSTAB ™ B 4690 | 1 | 1 | 1 |
| DABCO ™ 33LV | 0.5 | 0.5 | 0.5 |
| Diethanolamine | 1 | 1 | 1 |
| NIAX ™ A1 | 0.05 | 0.05 | 0.05 |
| Isocyanate System |  |  |  |
| LUPRANATE ™ T80 Type 1 | 38.81 | 39.25 | 39.69 |
| Isocyanate Index | 90 | 90 | 90 |
| Reaction Profile of Free-rise |  |  |  |
| Mix time (sec) |  |  |  |
| Component Temperature (° C.) | 23 | 23 | 23 |
| Mold Temperature (° C.) | 80 | 80 | 80 |
| Demolding Time (sec) | 260 | 260 | 260 |
| Properties |  |  |  |
| Free-rise density (grams/cc) | 0.0561 | 0.0535 | 0.0481 |
| Resilience (%) | 58 | 51 | 41 |
| CFD @ 25% (kPa) | 0.60 | 0.55 | 0.49 |
| CFD @ 50% (kPa) | 0.89 | 0.88 | 0.83 |
| CFD @ 65% (kPa) | 1.43 | 1.47 | 1.49 |
| Tensile Strength (kPa) | 19.7 | 23.5 | 24.0 |
| Elongation at Break (%) | 155 | 145 | 132 |
| Tear Strength (N/m) | 775 | 881 | 874 |
| Dry Compression @ 70° C. (%) | 5.2 | 5.8 | 6.8 |
| Wet Compression @ 50° C. (%) | 8.3 | 10.8 | 17.9 |
| Hysteresis | 31 | 34 | 36 |

Tensile and tear strengths increased significantly with poly(phenylene ether) incorporation. These property improvements when poly(phenylene ether) is part of the formulation indicate improvements in toughness of the foams.

The formulations of Comparative Example 6, and Example 17, 18, and 19 targeted high resilient flexible foams. Free rise water-blown foams were prepared with 0, 10, 20, and 30% poly(phenylene ether) and an isocyanate index of 90. Formulations, reaction profiles, and properties free-rise foams prepared with 3.2 parts by weight of water as a blowing agent are summarized in Table 7.

TABLE 7

|  | C. Ex. 6 | Ex. 17 | Ex. 18 | Ex. 19 |
|---|---|---|---|---|
| PPE-2OH content (wt % based on total polyol) | 0 | 10 | 20 | 30 |
| PPE-2OH content (wt % based on total reactants) | 0 | 7.07 | 14.09 | 21.07 |
| Polyol System |  |  |  |  |
| POLY-G ™ 85-29 | 48.5 | 43.5 | 38.5 | 33.5 |
| VORANOL ™ VORACTIV ™ 6340 | 48.5 | 43.5 | 38.5 | 33.5 |
| PPE-2OH | 0 | 10 | 20 | 30 |
| Water | 3.2 | 3.2 | 3.2 | 3.2 |
| LUMULSE ™ POE 26 | 3 | 3 | 3 | 3 |
| TEGOSTAB ™ B 4690 | 1 | 1 | 1 | 1 |
| DABCO ™ 33LV | 0.5 | 0.5 | 0.5 | 0.5 |
| Diethanolamine | 1 | 1 | 1 | 1 |
| NIAX ™ A1 | 0.05 | 0.05 | 0.05 | 0.05 |
| Isocyanate System |  |  |  |  |
| LUPRANATE ™ T80 Type 1 | 35.31 | 35.75 | 36.18 | 36.62 |
| Isocyanate Index | 90 | 90 | 90 | 90 |
| Reaction Profile of Free-rise |  |  |  |  |
| Size of Foam (grams) | 100 | 100 | 100 | 100 |
| Mix time (sec) | 5 | 5 | 5 | 5 |
| Cream time (sec) | 11 | 11 | 9 | 8 |
| Gel time (sec) | 30 | 24 | 22 | 20 |
| Rise time (sec) | 100 | 97 | 86 | 60 |
| Post-curing time & temperature | 20 min @ 70° C. | 20 min @ 70° C. | 20 min @ 70° C. | 20 min @ 70° C. |
| Properties |  |  |  |  |
| Free-rise density (grams/cc) | 0.0330 | 0.0327 | 0.0339 | 0.0373 |
| Resilience (%) | 60 | 51 | 37 | 26 |
| CFD @ 25% (kPa) | 0.90 | 1.38 | 1.79 | 5.10 |
| CFD @ 50% (kPa) | 1.52 | 2.48 | 3.59 | 9.45 |
| CFD @ 65% (kPa) | 2.62 | 4.41 | 6.41 | 17.79 |
| Tensile Strength (kPa) | 12.05 | 13.45 | 16.76 | 17.83 |
| Elongation at Break (%) | 150 | 125 | 154 | 100 |
| Tear Strength (N/m) | 509.6 | 582.8 | 767.3 | 799.7 |

The reactivity of the foaming system increased with increasing content of poly(phenylene ether), as indicated by reductions in cream time, gel time, and rise time values. Tensile and tear strength values increased with increasing content of poly(phenylene ether). The compression force deflection (CFD) measured at 25%, 50%, and 65% deflection increased with increasing content of poly(phenylene ether). These property improvements when poly(phenylene ether) is part of the formulation indicate improvements in load bearing properties and toughness of the foams.

The formulations in Comparative Example 7, and Examples 20, 21, and 22 targeted high resilient flexible foams. Free rise water-blown foams were prepared with 0, 10, 20, and 30% poly(phenylene ether) and an isocyanate index of 90. Formulations, reaction profiles, and properties free-rise foams prepared with 2.2 parts by weight of water as a blowing agent are summarized in Table 8.

The reactivity of the foaming system increased with increasing poly(phenylene ether) content, as evidenced by decreasing cream time, gel time, and rise time values. The compression force deflection (CFD) measured at 25%, 50%, and 65% deflection increased with increasing poly(phenylene ether) content, which indicates improvements in load bearing properties of the foams.

The formulations in Comparative Example 8, and Example 23, 24, 25, and 26 were used to prepare molded high resilient flexible foams. The molded foams were prepared with 0, 10, 30 and 40% poly(phenylene ether), with 2.2 parts by weight of water as a blowing agent, and an isocyanate index of 90. Formulations, curing conditions, and properties of the molded foams are summarized in Table 9.

TABLE 8

|  | C. Ex. 7 | Ex. 20 | Ex. 21 | Ex. 22 |
| --- | --- | --- | --- | --- |
| PPE-2OH content (wt % based on total polyol) | 0 | 10 | 20 | 30 |
| PPE-2OH content (wt % based on total reactants) | 0 | 7.59 | 15.13 | 22.62 |
| Polyol System | | | | |
| POLY-G ™ 85-29 | 48.5 | 43.5 | 38.5 | 33.5 |
| VORANOL ™ VORACTIV ™ 6340 | 48.5 | 43.5 | 38.5 | 33.5 |
| PPE-2OH | 0 | 10 | 20 | 30 |
| Water | 2.2 | 2.2 | 2.2 | 2.2 |
| LUMULSE ™ POE 26 | 3 | 3 | 3 | 3 |
| TEGOSTAB ™ B 4690 | 1 | 1 | 1 | 1 |
| DABCO ™ 33LV | 0.5 | 0.5 | 0.5 | 0.5 |
| Diethanolamine | 1 | 1 | 1 | 1 |
| NIAX ™ A1 | 0.05 | 0.05 | 0.05 | 0.05 |
| Isocyanate System | | | | |
| LUPRANATE ™ T80 Type 1 | 26.56 | 26.99 | 27.43 | 27.87 |
| Isocyanate Index | 90 | 90 | 90 | 90 |
| Reaction Profile of Free-rise | | | | |
| Size of Foam (grams) | 300 | 300 | 300 | 300 |
| Mix time (sec) | 5 | 5 | 5 | 5 |
| Cream time (sec) | 11 | 10 | 9 | 8 |
| Gel time (sec) | 35 | 36 | 30 | 19 |
| Rise time (sec) | 122 | 120 | 108 | 86 |
| Post-curing time & temperature | 30 min @ 80° C. | 30 min @ 80° C. | 30 min @ 80° C. | 30 min @ 80° C. |
| Properties | | | | |
| Free-rise density (grams/cc) | 0.0389 | 0.0401 | 0.0375 | 0.0384 |
| Resilience (%) | 63 | 57 | 57 | 56 |
| CFD @ 25% (kPa) | 0.76 | 0.69 | 1.03 | 0.97 |
| CFD @ 50% (kPa) | 1.38 | 1.59 | 2.07 | 2.21 |
| CFD @ 65% (kPa) | 2.69 | 3.17 | 4.21 | 4.62 |

TABLE 9

|  | C. Ex. 8 | Ex. 23 | Ex. 24 | Ex. 25 | Ex. 26 |
|---|---|---|---|---|---|
| PPE-2OH content (wt % based on total polyol) | 0 | 10 | 20 | 30 | 40 |
| PPE-2OH content (wt % based on total reactants) | 0 | 7.59 | 15.13 | 22.62 | 35.38 |
| Polyol System |  |  |  |  |  |
| POLY-G ™ 85-29 | 48.5 | 43.5 | 38.5 | 33.5 | 28.5 |
| VORANOL ™ VORACTIV ™ 6340 | 48.5 | 43.5 | 38.5 | 33.5 | 28.5 |
| PPE-2OH | 0 | 10 | 20 | 20 | 20 |
| Water | 2.2 | 2.2 | 2.2 | 2.2 | 2.2 |
| LUMULSE ™ POE 26 | 3 | 3 | 3 | 3 | 3 |
| TEGOSTAB ™ B 4690 | 1 | 1 | 1 | 1 | 1 |
| DABCO ™ 33LV | 0.5 | 0.5 | 0.5 | 0.5 | 0.5 |
| Diethanolamine | 1 | 1 | 1 | 1 | 1 |
| NIAX ™ A1 | 0.05 | 0.05 | 0.05 | 0.05 | 0.05 |
| Isocyanate System |  |  |  |  |  |
| LUPRANATE ™ T80 Type 1 | 26.56 | 26.99 | 27.43 | 27.87 | 28.31 |
| Isocyanate Index | 90 | 90 | 90 | 90 | 90 |
| Reaction Profile of Free-rise |  |  |  |  |  |
| Mix time (sec) | 5 | 5 | 5 | 5 | 5 |
| Component Temperature (° C.) | 23 | 23 | 23 | 23 | 23 |
| Mold Temperature (° C.) | 80 | 80 | 80 | 80 | 80 |
| Demolding Time (sec) | 260 | 260 | 260 | 260 | 260 |
| Properties |  |  |  |  |  |
| Free-rise density (grams/cc) | 0.0644 | 0.0625 | 0.0726 | 0.0657 | — |
| Resilience (%) | 66 | 52 | 59 | 55 | — |
| CFD @ 25% (kPa) | 3.24 | 3.10 | 3.45 | 3.38 | — |
| CFD @ 50% (kPa) | 5.17 | 4.83 | 6.83 | 7.03 | — |
| CFD @ 65% (kPa) | 8.48 | 8.62 | 15.72 | 16.41 | — |
| Tensile Strength (kPa) | 12.9 | — | 19.9 | — | — |
| Elongation at Break (%) | 160 | — | 147 | — | — |
| Tear Strength (N/m) | 544 | — | 913 | — | — |
| Dry Compression @ 70° C. (%) | 7.5 | — | 9.2 | — | — |
| Wet Compression @ 50° C. (%) | 4.5 | — | 10.7 | — | — |
| Hysteresis | 39 | — | 50 | — | — |

Tensile and tear strength values increased with poly(phenylene ether) incorporation. In general, the compression force deflection (CFD) measured at 50%, and 65% deflection increased with increasing poly(phenylene ether) content. These property improvements when poly(phenylene ether) is part of the formulation indicate improvements in load bearing properties and toughness of the foams.

The invention claimed is:

1. A polyurethane foam comprising the product of a reaction mixture comprising:
a polyol component comprising a poly(phenylene ether) having a number average molecular weight of 600 to 2000 atomic mass units and an average of 1.5 to 3 hydroxyl groups per molecule; wherein the poly(phenylene ether) comprises a hydroxy-diterminated poly(phenylene ether) having the structure

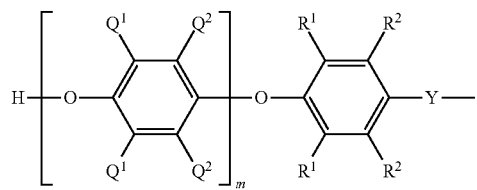

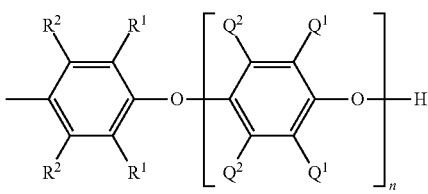

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$, hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

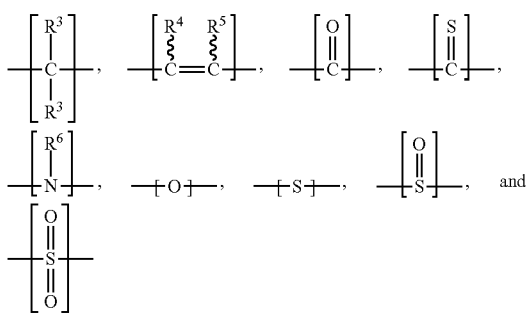

wherein each occurrence of $R^3$-$R^6$ is independently hydrogen or $C_1$-$C_{12}$ hydrocarbyl;

an aromatic isocyanate compound having an average of at least 2 isocyanate groups per molecule; and a blowing agent;

wherein the reaction mixture is characterized by an isocyanate index of 65 to 95; and wherein the polyurethane foam has a density of 0.01 to 0.16 gram/centimeter$^3$ measured at 23° C. according to ASTM D 3574-08, Test A.

2. The polyurethane foam of claim 1, wherein the poly(phenylene ether) is a copolymer of monomers comprising a monohydric phenol and a dihydric phenol; and wherein the monohydric phenol comprises 2,6-dimethylphenol and the dihydric phenol comprises 2,2-bis(3,5-dimethyl-4-hydroxyphenyl)propane.

3. The polyurethane foam of claim 1, wherein the polyol component comprises the poly(phenylene ether) in an amount of 5 to 50 weight percent, based on the weight of the polyol component.

4. The polyurethane foam of claim 1, wherein the polyol component further comprises an propylene oxide capped polyether triol, an ethylene oxide capped polyether polyol, or a combination thereof.

5. The polyurethane foam of claim 1, wherein the aromatic isocyanate compound comprises 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

6. The polyurethane foam of claim 1, wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof.

7. The polyurethane foam of claim 1, wherein the blowing agent comprises water.

8. The polyurethane foam of claim 1, wherein the reaction mixture further comprises a catalyst for forming urethane linkages.

9. The polyurethane foam of claim 1, wherein the reaction mixture comprises 40 to 84 weight percent of the polyol component, including 5 to 35 weight percent of the poly(phenylene ether);

15 to 55 weight percent of the aromatic isocyanate compound; and 1 to 5 weight percent of the blowing agent;

wherein all weight percents are based on the total weight of the polyol component, the aromatic isocyanate compound, and the blowing agent.

10. The polyurethane foam of claim 1, wherein the poly(phenylene ether) is a copolymer of monomers comprising 2,6-dimethylphenol and 2,2-bis (3,5-dimethyl-4-hydroxyphenyl)propane;

wherein the polyol component further comprises an ethylene oxide capped polyether triol, a propylene oxide capped polyether triol, an ethylene oxide capped polyether polyol, or a combination thereof;

wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof;

wherein the blowing agent comprises water; and wherein the reaction mixture comprises 40 to 84 weight percent of the polyol component, including 5 to 35 weight percent of the poly(phenylene ether);

15 to 55 weight percent of the aromatic isocyanate compound; and 1 to 5 weight percent of the blowing agent;

wherein all weight percents are based on the total weight of the polyol component, the aromatic isocyanate compound, and the blowing agent.

11. An article comprising a polyurethane foam, the polyurethane foam comprising the product of a reaction mixture comprising:

a polyol component comprising a poly(phenylene ether) having a number average molecular weight of 600 to 2000 atomic mass units and an average of 1.5 to 3 hydroxyl groups per molecule; wherein the poly(phenylene ether) comprises a hydroxy-diterminated poly (phenylene ether) having the structure

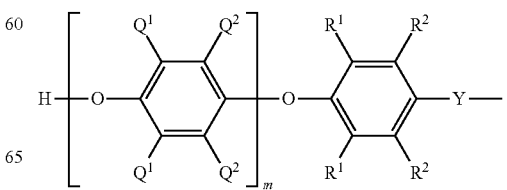

-continued

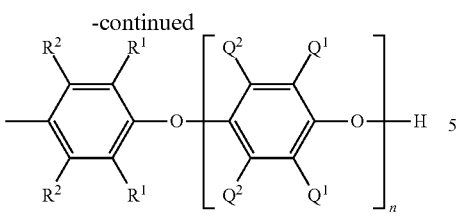

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

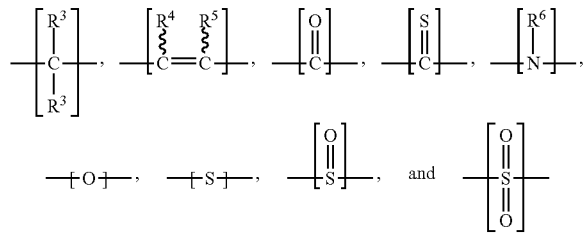

wherein each occurrence of $R^3$-$R^6$ is independently hydrogen or $C_1$-$C_{12}$ hydrocarbyl;
an aromatic isocyanate compound having an average of at least 2 isocyanate groups per molecule; and
a blowing agent;
wherein the reaction mixture is characterized by an isocyanate index of 65 to 95; and
wherein the polyurethane foam has a density of 0.01 to 0.16 gram/centimeter$^3$ measured at 23° C. according to ASTM D 3574-08, Test A.

12. The article of claim 11, selected from the group consisting of bedding, furniture, automotive interiors, mass transportation interiors, flooring underlay, packaging, textiles, lining and gasketing applications, acoustic dampening materials, and weather stripping.

13. The article of claim 11,
wherein the poly(phenylene ether) is a copolymer of monomers comprising 2,6-dimethylphenol and 2,2-bis(3,5-dimethyl-4-hydroxyphenyl)propane;
wherein the polyol component further comprises a propylene oxide capped polyether triol, an ethylene oxide capped polyether polyol, or a combination thereof;
wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof;
wherein the blowing agent comprises water; and
wherein the reaction mixture comprises
40 to 84 weight percent of the polyol component, including 5 to 35 weight percent of the poly(phenylene ether);
15 to 55 weight percent of the aromatic isocyanate compound; and
1 to 5 weight percent of the blowing agent;
wherein all weight percents are based on the total weight of the polyol component, the aromatic isocyanate compound, and the blowing agent.

14. A method of forming a polyurethane foam, the method comprising:
reacting a polyol component with an aromatic isocyanate compound in the presence of a blowing agent to form a polyurethane foam;
wherein the polyol component comprises a poly(phenylene ether) having a number average molecular weight of 600 to 2000 atomic mass units and an average of 1.5 to 3 hydroxyl groups per molecule; wherein the poly(phenylene ether) comprises a hydroxy-diterminated poly(phenylene ether) having the structure

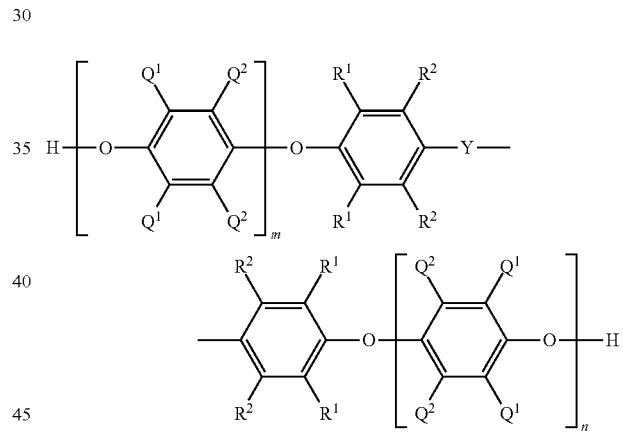

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

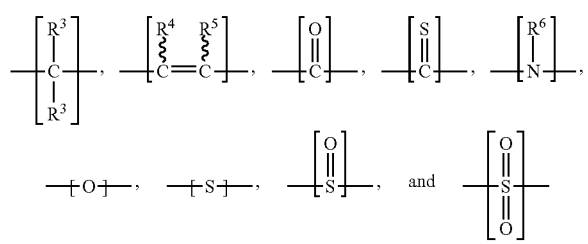

wherein each occurrence of $R^3$-$R^6$ is independently hydrogen or $C_1$-$C_{12}$ hydrocarbyl;

wherein the aromatic isocyanate compound has an average of at least 2 isocyanate groups per molecule;

wherein the reacting is characterized by an isocyanate index of 65 to 95; and wherein the polyurethane foam has a density of 0.01 to 0.16 gram/centimeter$^3$ measured at 23° C. according to ASTM D 3574-08, Test A.

15. The method of claim 14, wherein, based on the total weight of the polyol component, the aromatic isocyanate compound, and the blowing agent, the polyol component is used in an amount of 40 to 84 weight percent, including 5 to 35 weight percent of the poly(phenylene ether);

the aromatic isocyanate compound is used in an amount of 15 to 55 weight percent, and the blowing agent is used in an amount of 1 to 5 weight percent.

16. The method of claim 14, wherein the poly(phenylene ether) is a copolymer of monomers comprising 2,6-dimethylphenol and 2,2-bis(3,5-dimethyl-4-hydroxyphenyl)propane;

wherein the polyol component further comprises a propylene oxide capped polyether triol an ethylene oxide capped polyether polyol, or a combination thereof;

wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof;

wherein the blowing agent comprises water; and wherein, based on the total weight of the polyol component, the aromatic isocyanate compound, and the blowing agent, the polyol component is used in an amount of 40 to 84 weight percent, including 5 to 35 weight percent of the poly(phenylene ether);

the aromatic isocyanate compound is used in an amount of 15 to 55 weight percent, and the blowing agent is used in an amount of 1 to 5 weight percent.

* * * * *